Patented Jan. 5, 1954

2,665,212

UNITED STATES PATENT OFFICE 2,665,212

THICKENING AND STABILIZING AGENTS

Charles T. Roland, Bethel Borough, Pa., assignor to Calgon, Inc., Pittsburgh, Pa., a corporation of Pennsylvania No Drawing. Application August 29, 1950, Serial No. 182,140

17 Claims. (Cl. 99—25)

This invention relates to thickening and stabilizing agents made from milk protein for producing products of desired viscosity and more particularly to a process for making and using such a stabilizer. An example of the use of such a stabilizing agent is the preparation of chocolate milk drinks. The present invention is an improvement over the invention disclosed and claimed in Partridge application Serial No. 642,019 filed January 18, 1946. Briefly, the Partridge application discloses a process of increasing the viscosity of solutions containing milk protein, as for example a chocolate milk drink, by adding water-insoluble crystalline potassium metaphosphate (with or without a solubilizing agent for the potassium metaphosphate) to a solution of milk protein, i. e., to a chocolate milk drink. In the Partridge process, the water-insoluble crystalline potassium metaphosphate is added directly to the chocolate milk drink or is predissolved in water and the aqueous solution of the potassium metaphosphate is added directly to the chocolate milk drink.

In accordance with my invention, I first prepare a thickening and stabilizing agent having a viscosity substantially higher than the viscosity desired in the final product. This stabilizer may be made by reacting skim milk or other milk protein in aqueous suspension with a water-insoluble crystalline metaphosphate of the group consisting of potassium and sodium (Kurrol) metaphosphate in an amount sufficient to develop substantially the maximum viscosity in the milk protein suspension. This may be done, for example, by heating a mixture of skim milk, one of the group consisting of water-insoluble crystalline potassium metaphosphate, water-insoluble crystalline sodium (Kurrol) metaphosphate and mixtures thereof in an amount sufficient to develop the maximum viscosity in the skim milk, about 0.3% to about 0.5% on the weight of the milk, and a solubilizing agent for the metaphosphate. The stabilizer so produced is then utilized in the formulation of the finished product of desired viscosity.

My process has three important advantages over the Partridge process. It decreases the amount of water-insoluble crystalline potassium or sodium (Kurrol) metaphosphate which is required to produce a given viscosity in, for example, a milk or milk protein containing product and at the same time makes less critical the degree of control required in the amount of metaphosphate which is used; furthermore, I may use my product for thickening aqueous dispersions other than milk or milk protein dispersions. In the Partridge process the amount of potassium metaphosphate required to produce a given viscosity is rather critical, a change of 0.05% by weight of potassium metaphosphate making as much as a fifty fold change in viscosity, but in my process a given viscosity of the final protein product may be easily and accurately obtained by the use of an amount of metaphosphate so small as to be entirely out of proportion to that used for comparable viscosities obtained by additions taught in the Partridge process.

I have found that much better results can be obtained by following my two-step process than can be obtained according to the Partridge process. In my process the amount of water-insoluble crystalline metaphosphate required is considerably less than the amount which is required according to the Partridge process in order to produce the same viscosity in a chocolate milk drink or other product whose viscosity it is desired to control. Furthermore, in my process the amount of water-insoluble crystalline metaphosphate and solubilizing agent therefor which is added to the milk protein product can be more accurately controlled so as to more accurately control the viscosity of the final product.

I will describe my process as applied to making a chocolate milk drink, it being understood that the process is useful in making any of the other products referred to herein, whether aqueous dispersions of milk solids or other dispersions whose viscosity it is desired to control. In carrying out my process a thickening and stabilizing agent (or stabilizer as it will be referred to hereafter) is first prepared, the stabilizer having a viscosity substantially higher than the viscosity desired in the finished chocolate milk drink. Thereafter, the stabilizer is utilized in the formulation of the finished chocolate milk drink. The stabilizer may be formed by heating skim milk, and one or a combination of the group consisting of water-insoluble crystalline potassium metaphosphate and water-insoluble crystalline sodium (Kurrol) metaphosphate and a solubilizing agent for the metaphosphate. In general, it may be said that the solubilizing agent preferably should contain the cation of the aforementioned group which does not appear in the metaphosphate. For example, it is preferred to employ about 0.3% to 0.5% of potassium metaphosphate, specifically about 0.375% potassium metaphosphate and as a solubilizing agent, about 0.1% to 0.4% of sodium citrate, sodium chloride, sodium bicarbonate, sodium phosphate or sodium sulphate or a mixture thereof, based on the weight of the skim milk used in making the stabilizer. Or I may employ a mixture of water-insoluble crystalline sodium (Kurrol) and potassium metaphosphates which co-dissolves with or without addition of solubilizing agents. A suitable mixture comprises 0.25% sodium (Kurrol) metaphosphate and 0.25% potassium metaphosphate based on the weight of the skim milk. The water-insoluble crystalline metaphosphate and solubilizing agent are preferably predissolved in a small amount of heated water or skim milk before adding to the skim milk, or they may be added directly to the skim milk at a temperature of about 150° F., mixed, and allowed to stand until maximum viscosity is obtained, which is usually about 5 to 10 minutes. The stabilizer so produced has a viscosity of the order of about 500 to 1000 centipoises. The viscosity of the usual stabilized chocolate milk drink of commerce in which the cocoa particles are retained suspended is of the order of 10 to 20 centipoises. A non-stabilized chocolate milk drink of similar composition has a viscosity of the order of 5 centipoises. It is thus seen that my stabilizer has a viscosity many times that required in the finished chocolate milk drink.

The stabilizer is preferably added to the chocolate milk batch just before pasteurization and the mixture pasteurized in the regular manner. The amount of stabilizer used will depend upon its viscosity and the viscosity desired in the finished chocolate milk drink but when the stabilizer is prepared as described it may be used in the proportion of about 15% to 25% by weight of the finished chocolate milk drink.

To cite a specific example, 0.3 gm. sodium citrate hydrate (5½ $H_2O$) and 1 gm. water-insoluble crystalline potassium metaphosphate were co-dissolved in 5 ml. distilled water heated to a boil. This solution was then added with stirring to 200 ml. fresh skim milk in a constant temperature bath at 150° F. After reacting for about 10 minutes, the stabilizer of my invention thereby produced was added in various proportions to plain skim milk also held at 150° F. To each 200 ml. of stabilized milk was added 25 ml. of a chocolate flavoring syrup. All chocolate milk samples thus prepared were held at 150° F. a total of 30 minutes for the purpose of pasteurization, following which they were cooled to about 40° F. and stored at that temperature overnight. The composition and properties of these chocolate milk samples are shown in the table.

While it is preferred to form the thickening and stabilizing agent by reacting water-insoluble crystalline metaphosphate and a solubilizing agent therefor with skim milk, because skim milk is a readily available source of milk protein, I may use any other composition which contains milk protein in place of part or all of the skim milk. I may, for example, use whole milk, cream, buttermilk, any dried milk protein-containing material such as dried skim milk, dried whole milk, dried cream and dried buttermilk. I may also use casein or the purified proteins of milk which have been separated from a part or all of the fats, sugar, minerals, and water by a natural souring process or by a chemical, enzymatic or mechanical separation process.

The preparation of a stabilizer of high viscosity and its subsequent use to produce a product of desired but lower viscosity is not limited to the production of chocolate milk drinks or aqueous dispersions containing milk protein but is useful for thickening aqueous dispersions in general. The preparation of a highly viscous thickening and stabilizing agent and its subsequent dilution may be employed to advantage in any of the products or processes mentioned in the Partridge application. For example, the stabilizer of this invention may be used to improve milk products in general, both edible and inedible. Moreover, the material may also be used for improving materials which do not contain milk or other proteins such as puddings, purees, soups, juices, suspensions of abrasive material, clays or other pigments, etc.

In connection with the method of this invention, it is important to note that only the water-insoluble crystalline potassium metaphosphate and the water-insoluble crystalline sodium (Kurrol) metaphosphate have the power to markedly increase the viscosity of milk protein dispersions. Moreover, the viscosity of the resulting thickening agent increases as the temperature at which the metaphosphate was prepared increases. Accordingly, it is preferred to prepare the crystalline phosphate for use in this invention at a

*Table*

| Composition of chocolate milk | | | | | Properties | |
|---|---|---|---|---|---|---|
| Skim milk, percent by volume | Skim milk stabilizer, percent by volume | Chocolate syrup, percent by volume | $KPO_3$, percent by weight of total milk | Sodium citrate hydrate, percent by weight of total milk | Viscosity in centipoises at 25° C. | Remarks |
| 89 | None | 11 | None | None | 5.3 | Sediment. |
| 82 | 7 | 11 | 0.04 | 0.01 | 6.7 | Do. |
| 78 | 11 | 11 | 0.06 | 0.02 | 9.3 | Slight sediment. |
| 67 | 22 | 11 | 0.13 | 0.04 | 16.6 | No sediment. |
| 56 | 33 | 11 | 0.19 | 0.06 | 125 | Do. |
| None | 100 | None | 0.50 | 0.15 | 660 | |

In the example just described, the stabilizer had a viscosity of about 660 centipoises. This viscosity is not critical and stabilizers of other viscosities may be employed. In my method, however, the viscosity of the stabilizer always is substantially higher than the viscosity desired in the finished chocolate milk drink or other product. The chocolate milk drink prepared according to my method and containing 0.13% water-insoluble crystalline potassium metaphosphate and 0.04% sodium citrate hydrate as a result of the addition of 22% of the stabilizer of my invention was smooth and creamy to the taste and the cocoa particles did not settle to the bottom on standing overnight in a refrigerator.

temperature between the melting point and about 200° C. below the melting point.

Both the crystalline potassium metaphosphate and sodium (Kurrol) metaphosphate are substantially insoluble in water. Both materials, however, may be solubilized by the addition of any water-soluble alkali metal salt containing alkali metal ions other than the metal ion of the metaphosphate being solubilized. For example, the water-insoluble potassium metaphosphate may be solubilized by the addition of any water-soluble alkali metal salt other than potassium salts, and the water-insoluble sodium (Kurrol) metaphosphate by any water-soluble alkali metal salt other than sodium salts. In addition to the aforementioned alkali metal salts, the water-insoluble metaphosphates may be solubilized by water-soluble salts of ammonium, calcium, barium and magnesium. It should, of course, be noted that only salts which do not have a toxic effect on the human body should be used in the preparation of food products.

The water-insoluble crystalline potassium metaphosphate and the water-insoluble crystalline sodium metaphosphates (both Kurrol and Maddrell salts) will interact in water to produce mutual dissolution. Accordingly, combination of the water-insoluble potassium and sodium metaphosphates may be used. While the water-insoluble sodium (Maddrell) metaphosphate does not itself effect an increase in viscosity of milk proteins as does the water-insoluble potassium and sodium (Kurrol) metaphosphates, it may be used to solubilize the water-insoluble potassium metaphosphate.

The mechanism which takes place in effecting the unusual change in viscosity resulting from following the teaching of my invention is not completely known. I believe that there is a physical or chemical reaction between the milk protein and the solubilized water-insoluble crystalline metaphosphate which results in the formation of a new protein-metaphosphate combination or polymerization product possessing high water binding capacity and exhibiting high viscosity in aqueous dispersion. When the thickening and stabilizing agent of my invention is then added to a solution containing milk protein, the resulting viscosity is substantially greater than that which would result if the same quantity of water-insoluble phosphate were added directly to the solution containing a milk protein as taught by the aforementioned Partridge application.

While the mechanism of the reaction is not entirely understood, it is clear that whatever the mechanism of the reaction may be, the stabilizer of this invention when prepared according to the teachings above set out has a surprising and unexpected effect on the viscosity of aqueous dispersions and reduces materially the quantity of phosphate necessary to produce a given viscosity according to the Partridge process.

While I have set out certain preferred examples, this invention is not limited to these examples but may be otherwise embodied or practiced within the scope of the following claims.

I claim:

1. A process of making an aqueous solution or dispersion of desired viscosity, which comprises preparing a thickening and stabilizing agent having a viscosity substantially higher than the viscosity desired in the finished product by reacting an aqueous dispersion containing milk protein, a water-insoluble crystalline metaphosphate of the group consisting of potassium and sodium (Kurrol) metaphosphates and mixtures thereof, and a solubilizing agent for the metaphosphate and thereafter utilizing the thickening and stabilizing agent in the formulation of the finished aqueous solution or dispersion of desired viscosity.

2. A process of making an aqueous dispersion of desired viscosity, which comprises preparing a thickening and stabilizing agent having a viscosity substantially higher than the viscosity desired in the finished product by reacting skim milk, a water-insoluble crystalline metaphosphate of the group consisting of potassium and sodium (Kurrol) metaphosphates and mixtures thereof, and a solubilizing agent for the metaphosphate and thereafter utilizing the thickening and stabilizing agents in the formulation of the finished aqueous dispersion of desired viscosity.

3. A process of making a chocolate milk drink of desired viscosity, which comprises preparing a thickening and stabilizing agent having a viscosity substantially higher than the viscosity desired in the finished chocolate milk drink by reacting a milk protein, a water-insoluble crystalline metaphosphate of the group consisting of potassium and sodium (Kurrol) metaphosphates and mixtures thereof, and a solubilizing agent for the metaphosphate and thereafter utilizing the thickening and stabilizing agent in the formulation of the finished chocolate milk drink of desired viscosity.

4. A process of making a chocolate milk drink of desired viscosity, which comprises preparing a thickening and stabilizing agent having a viscosity substantially higher than the viscosity desired in the finished chocolate milk drink by reacting skim milk, water-insoluble crystalline potassium metaphosphate, and a solubilizing agent for the metaphosphate and thereafter utilizing the thickening and stabilizing agent in the formulation of the finished chocolate milk drink of desired viscosity.

5. A process of making a protein product of desired viscosity, which comprises preparing a thickening and stabilizing agent having a viscosity substantially higher than the viscosity desired in the finished product by heating a mixture of milk protein, a water-insoluble crystalline metaphosphate of the group consisting of potassium and sodium (Kurrol) metaphosphates and mixtures thereof and a solubilizing agent for the metaphosphate, and thereafter utilizing the thickening and stabilizing agent in the formulation of the finished protein product of desired viscosity.

6. A process of making a protein product of desired viscosity, which comprises preparing a thickening and stabilizing agent having a viscosity substantially higher than the viscosity desired in the finished product by heating a mixture of skim milk, a water-insoluble crystalline metaphosphate of the group consisting of potassium and sodium (Kurrol) metaphosphates, and mixtures thereof, and a solubilizing agent for the metaphosphate, and thereafter utilizing the thickening and stabilizing agent in the formulation of the finished protein product of desired viscosity.

7. A process of making a milk protein product of desired viscosity, which comprises preparing a thickening and stabilizing agent having a viscosity substantially higher than the viscosity desired in the finished product by heating a mixture of milk protein, water-insoluble crystalline potassium metaphosphate and a solubilizing agent for the potassium metaphosphate, and thereafter mixing the thickening and stabilizing agent and milk protein product to produce the finished milk protein product of desired viscosity.

8. A process of making a milk protein product of desired viscosity, which comprises preparing a thickening and stabilizing agent having a viscosity substantially higher than the viscosity desired in the finished product by heating a mixture of skim milk, a water-insoluble crystalline metaphosphate of the group consisting of potassium and sodium (Kurrol) metaphosphates and mixtures thereof in an amount equal to about 0.3% to 0.5% of the skim milk and a solubilizing agent for the metaphosphate, and thereafter mixing the thickening and stabilizing agent and milk protein product to produce the finished milk protein product of desired viscosity.

9. A process of making a chocolate milk drink of desired viscosity, which comprises preparing a thickening and stabilizing agent having a viscosity substantially higher than the viscosity desired in the finished chocolate milk drink by heating a mixture of milk protein, water-insoluble crystalline potassium metaphosphate and an edible solubilizing agent for the potassium metaphosphate, and thereafter mixing the thickening and stabilizing agent into the chocolate milk drink whose viscosity is to be controlled.

10. A process of making a chocolate milk drink of desired viscosity, which comprises preparing a thickening and stabilizing agent having a viscosity substantially higher than the viscosity desired in the finished chocolate milk drink by heating a mixture of milk protein, water-insoluble crystalline sodium (Kurrol) metaphosphate and an edible solubilizing agent for the sodium (Kurrol) metaphosphate, and thereafter mixing the thickening and stabilizing agent into the chocolate milk drink whose viscosity is to be controlled.

11. A process of making an aqueous solution or dispersion of desired viscosity, which comprises preparing a thickening and stabilizing agent having a viscosity substantially higher than the viscosity desired in the finished product by heating a mixture of a milk protein, a water-insoluble crystalline metaphosphate of the group consisting of potassium and sodium (Kurrol) metaphosphates and mixtures thereof, and a solubilizing agent for the metaphosphate selected from the class consisting of ammonium salts, calcium salts, magnesium salts, and salts of alkali-metal other than the cation of the metaphosphate, and thereafter utilizing the thickening and stabilizing agent in the formulation of the finished aqueous solution or dispersion of desired viscosity.

12. A process of making an aqueous solution or dispersion of desired viscosity, which comprises preparing a thickening and stabilizing agent having a viscosity substantially higher than the viscosity desired in the finished product by heating a mixture of milk protein, water-insoluble crystalline potassium metaphosphate and a solubilizing agent for the potassium metaphosphate selected from the class consisting of ammonium salts, calcium salts, magnesium salts, and alkali-metal salts other than potassium salts, and thereafter mixing the thickening and stabilizing agent and the aqueous solution or dispersion to produce the finished product of desired viscosity.

13. A process of making a milk protein product of desired viscosity, which comprises preparing a thickening and stabilizing agent having a viscosity substantially higher than the viscosity desired in the finished product by heating a mixture of skim milk, water-insoluble crystalline potassium metaphosphate and solubilizing agent for the potassium metaphosphate selected from the class consisting of ammonium salts, calcium salts, magnesium salts, and alkali-metal salts other than potassium salts, and thereafter mixing the thickening and stabilizing agent and milk protein to produce the finished milk protein product of desired viscosity.

14. A process of making a chocolate milk drink of desired viscosity which comprises preparing a thickening and stabilizing agent having a viscosity substantially higher than the viscosity desired in the finished chocolate milk drink by reacting skim milk and a water-insoluble crystalline metaphosphate of the group consisting of posassium and sodium (Kurrol) metaphosphates, and mixtures thereof in an amount equal to about 0.3% to 0.5% of the skim milk in the presence of a solubilizing agent for the metaphosphate, and thereafter utilizing the thickening and stabilizing agent in the formulation of the finished chocolate milk drink of desired viscosity.

15. A process of making an aqueous solution or dispersion of desired viscosity which comprises preparing a thickening and stabilizing agent having a viscosity substantially higher than the viscosity desired in the finished product by heating a mixture of milk protein, a water-insoluble crystalline metaphosphate of the group consisting of potassium and sodium (Kurrol) metaphosphates and mixtures thereof in an amount sufficient to develop the maximum viscosity in the milk protein and a solubilizing agent for the metaphosphate, and thereafter mixing the thickening and stabilizing agent with the solution or dispersion whose viscosity is to be controlled.

16. A process of making an aqueous solution or dispersion of desired viscosity which comprises preparing a thickening and stabilizing agent having a viscosity substantially higher than the viscosity desired in the finished product by reacting a mixture of skim milk and water-insoluble crystalline sodium (Kurrol) metaphosphate in an amount equal to about 0.3% to 0.5% of the skim milk in the presence of a solubilizing agent for the sodium (Kurrol) metaphosphate, and thereafter adding the thickening and stabilizing agent to the solution or dispersion whose viscosity is to be altered.

17. A process of making a chocolate milk drink of desired viscosity which comprises preparing a thickening and stabilizing agent having a viscosity substantially higher than the viscosity desired in the finished product by reacting a mixture of milk protein, a water-insoluble crystalline metaphosphate of the group consisting of potassium and sodium (Kurrol) metaphosphates and mixtures thereof in an amount sufficient to develop the maximum viscosity in the milk protein and a solubilizing agent for the metaphosphate, and thereafter adding the thickening and stabilizing agent to the remaining ingredients to form a chocolate milk drink.

CHARLES T. ROLAND.

References Cited in the file of this patent

UNITED STATES PATENTS

| Number | Name | Date |
|---|---|---|
| 1,897,892 | Draisbach | Feb. 14, 1933 |
| 2,064,387 | Schwartz | Dec. 15, 1936 |
| 2,097,229 | Lucas | Oct. 26, 1937 |
| 2,097,230 | Lucas | Oct. 26, 1937 |
| 2,135,054 | Schwartz | Nov. 1, 1938 |
| 2,216,485 | Brandt | Oct. 1, 1940 |
| 2,238,906 | Martell et al. | Apr. 22, 1941 |
| 2,253,389 | Mnookin | Aug. 19, 1941 |
| 2,267,911 | Grettie et al. | Dec. 30, 1941 |
| 2,341,425 | Curry | Feb. 8, 1944 |
| 2,405,276 | Taylor | Aug. 6, 1946 |
| 2,564,374 | Roland | Aug. 14, 1951 |

FOREIGN PATENTS

| Number | Country | Date |
|---|---|---|
| 395,312 | Canada | Mar. 18, 1941 |